(12) United States Patent
Pedersen et al.

(10) Patent No.: US 10,272,575 B2
(45) Date of Patent: Apr. 30, 2019

(54) DEFENSE RELATED ROBOTIC SYSTEMS

(71) Applicant: RE2, Inc., Pittsburgh, PA (US)

(72) Inventors: Jorgen Pedersen, Gibsonia, PA (US);
Jesse Easudes, Pittsburgh, PA (US);
Keith M. Gunnett, Allison Park, PA (US); John Culbertson, Pittsburgh, PA (US); Timothy Davison, Pittsburgh, PA (US)

(73) Assignee: RE2, Inc., Pittsburgh, PA (US)

( * ) Notice: Subject to any disclaimer, the term of this patent is extended or adjusted under 35 U.S.C. 154(b) by 430 days.

(21) Appl. No.: 14/834,867

(22) Filed: Aug. 25, 2015

(65) Prior Publication Data

US 2016/0059423 A1 Mar. 3, 2016

Related U.S. Application Data

(62) Division of application No. 12/167,735, filed on Jul. 3, 2008, now Pat. No. 9,144,909.

(Continued)

(51) Int. Cl.
*B25J 15/04* (2006.01)
*F16B 21/04* (2006.01)
(Continued)

(52) U.S. Cl.
CPC .......... *B25J 15/0408* (2013.01); *B23B 31/11* (2013.01); *B23B 31/113* (2013.01); *B25J 13/08* (2013.01);
(Continued)

(58) Field of Classification Search
CPC ........ A61B 19/2203; A61B 2019/2242; A61B 2019/2249; A61B 2019/2253;
(Continued)

(56) References Cited

U.S. PATENT DOCUMENTS

| 4,124,318 A | 11/1978 | Sagady |
| 4,165,854 A | 8/1979 | Duly |

(Continued)

FOREIGN PATENT DOCUMENTS

WO 2017144505 A1 8/2017

*Primary Examiner* — William Kelleher
*Assistant Examiner* — Gregory T Prather
(74) *Attorney, Agent, or Firm* — The Webb Law Firm

(57) ABSTRACT

A robot quick-release assembly has a first joint member and a robot component mounted thereon, the first joint member has a first coupler and a second joint member, a robot arm mounted thereon, has a second coupler, a clamp, and a locking collar. The first coupler can be coaxially aligned with the second coupler and pressed into the second joint member, and detachably connected to the second joint member. The first mechanical coupler is detachably connected to the second mechanical coupler for transferring power across the quick-release assembly. The robot component can receive an additional electrical connector, the additional electrical connector supplying power to the robot component. The quick-release assembly coupling assembly further exerts large forces with the application of a relatively small torque to the locking collar by applying a two stage wedge engagement and can further include a sequencing system.

3 Claims, 14 Drawing Sheets

Related U.S. Application Data

(60) Provisional application No. 60/958,405, filed on Jul. 5, 2007.

(51) Int. Cl.
*B23B 31/11* (2006.01)
*B23B 31/113* (2006.01)
*F16B 7/20* (2006.01)
*H01R 13/625* (2006.01)
*B25J 19/00* (2006.01)
*B25J 13/08* (2006.01)
*B25J 17/00* (2006.01)
*B25J 19/04* (2006.01)

(52) U.S. Cl.
CPC ............ *B25J 15/04* (2013.01); *B25J 15/045* (2013.01); *B25J 15/0483* (2013.01); *B25J 17/00* (2013.01); *B25J 19/0029* (2013.01); *B25J 19/04* (2013.01); *F16B 7/20* (2013.01); *F16B 21/04* (2013.01); *H01R 13/625* (2013.01); *Y10S 901/28* (2013.01); *Y10T 74/20329* (2015.01); *Y10T 403/18* (2015.01)

(58) Field of Classification Search
CPC .... A61B 2019/2269; A61B 2019/2288; A61B 2019/2292; A61B 2019/2296; A61B 90/98; B23B 31/113; B23B 31/11; B23B 31/1107; B25J 15/04; B25J 15/0408; B25J 15/0483; H01R 13/625; F16B 7/20; F16B 21/04; F16L 19/0206
USPC ...... 74/490.01–490.06; 403/321, 322.1, 328, 403/330; 483/9
See application file for complete search history.

(56) References Cited

U.S. PATENT DOCUMENTS

| | | | | |
|---|---|---|---|---|
| 4,188,942 A | | 2/1980 | Fehlberg | |
| 4,502,808 A | | 3/1985 | Didion et al. | |
| 4,620,362 A | * | 11/1986 | Reynolds | B25J 15/04 279/900 |
| 4,636,135 A | | 1/1987 | Bancon | |
| 4,640,639 A | | 2/1987 | Matsui | |
| 4,656,329 A | | 4/1987 | Moerke | |
| 4,664,588 A | | 5/1987 | Newell et al. | |
| 4,668,119 A | | 5/1987 | Galletti | |
| 4,698,766 A | * | 10/1987 | Entwistle | G05B 19/41835 700/100 |
| 4,756,638 A | | 7/1988 | Neyret | |
| 4,766,775 A | | 8/1988 | Hodge | |
| 4,815,780 A | | 3/1989 | Obrist | |
| 4,863,206 A | | 9/1989 | Kaufmann | |
| 4,881,760 A | | 11/1989 | Runkles et al. | |
| 4,897,014 A | | 1/1990 | Tietze | |
| 4,905,938 A | | 3/1990 | Braccio et al. | |
| 4,906,123 A | | 3/1990 | Weskamp et al. | |
| 4,979,949 A | * | 12/1990 | Matsen, III | A61B 17/15 414/9 |
| 4,990,022 A | | 2/1991 | Watanabe et al. | |
| 5,069,524 A | | 12/1991 | Watanabe et al. | |
| 5,118,248 A | | 6/1992 | Brücher | |
| 5,156,481 A | | 10/1992 | Overbay et al. | |
| 5,171,527 A | | 12/1992 | Knippscheer et al. | |
| 5,186,567 A | | 2/1993 | Evenson et al. | |
| 5,195,042 A | | 3/1993 | Ferraro et al. | |
| 5,209,028 A | | 5/1993 | McDermott et al. | |
| 5,261,758 A | | 11/1993 | Vranish | |
| 5,294,209 A | | 3/1994 | Naka et al. | |
| 5,357,076 A | * | 10/1994 | Blankenship | B23K 9/10 219/121.54 |
| 5,372,147 A | | 12/1994 | Lathrop, Jr. et al. | |
| 5,372,464 A | | 12/1994 | Bureller | |
| 5,522,669 A | | 6/1996 | Recker | |
| 5,523,662 A | | 6/1996 | Goldenberg et al. | |
| 5,647,554 A | | 7/1997 | Ikegami et al. | |
| 5,653,475 A | | 8/1997 | Scheyhing et al. | |
| 5,661,387 A | | 8/1997 | Stadele et al. | |
| 5,829,792 A | | 11/1998 | Nordström | |
| 5,871,239 A | | 2/1999 | Boscaljon et al. | |
| 5,895,549 A | | 4/1999 | Goto et al. | |
| 6,072,146 A | * | 6/2000 | Matuschek | B23K 11/24 219/110 |
| 6,084,373 A | | 7/2000 | Goldenberg et al. | |
| 6,113,343 A | | 9/2000 | Goldenberg et al. | |
| 6,254,303 B1 | | 7/2001 | Falat et al. | |
| 6,290,182 B1 | | 9/2001 | Grunditz | |
| 6,299,431 B1 | | 10/2001 | Neter | |
| 6,331,181 B1 | * | 12/2001 | Tierney | G06Q 30/02 600/429 |
| 6,349,884 B1 | | 2/2002 | Thome et al. | |
| 6,379,072 B1 | | 4/2002 | Brown et al. | |
| 6,394,998 B1 | | 5/2002 | Wallace et al. | |
| 6,430,979 B1 | | 8/2002 | Meier | |
| 6,447,197 B1 | | 9/2002 | Hiura | |
| 6,558,632 B1 | | 5/2003 | Güller et al. | |
| 6,581,437 B2 | | 6/2003 | Chrystall et al. | |
| 6,719,677 B2 | | 4/2004 | Izumi | |
| 6,767,198 B2 | | 7/2004 | Weinstein et al. | |
| 6,769,830 B1 | | 8/2004 | Nygren | |
| 6,935,805 B2 | | 8/2005 | O'Brien et al. | |
| 7,074,129 B2 | | 7/2006 | Sugiyama et al. | |
| 7,101,124 B2 | | 9/2006 | Keightley | |
| 7,204,792 B2 | | 4/2007 | Hagihara et al. | |
| 7,217,060 B2 | | 5/2007 | Ingimarsson | |
| 7,222,889 B2 | | 5/2007 | Breay | |
| 7,306,396 B1 | | 12/2007 | Chen | |
| 7,374,377 B2 | | 5/2008 | Bauman | |
| 7,505,377 B1 | * | 3/2009 | Peterson | B41J 2/175 369/30.03 |
| 9,330,575 B2 | * | 5/2016 | Peters | G09B 5/00 |
| 2002/0077787 A1 | * | 6/2002 | Rappaport | H04L 41/12 702/188 |
| 2002/0166403 A1 | | 11/2002 | Choset et al. | |
| 2003/0216821 A1 | * | 11/2003 | Kim | G05B 19/401 700/56 |
| 2004/0092991 A1 | * | 5/2004 | Deng | A61B 17/32002 606/170 |
| 2004/0142803 A1 | * | 7/2004 | Fitzgibbon | B23Q 3/15546 483/9 |
| 2004/0267254 A1 | | 12/2004 | Manzo et al. | |
| 2007/0020065 A1 | | 1/2007 | Kirby | |
| 2007/0146383 A1 | * | 6/2007 | Bayramoglu | G01J 3/50 345/589 |
| 2007/0240244 A1 | | 10/2007 | Grodecki | |
| 2008/0011142 A1 | | 1/2008 | Cheung et al. | |
| 2008/0012517 A1 | | 1/2008 | Kniss et al. | |
| 2008/0167644 A1 | * | 7/2008 | Shelton | A61B 17/07207 606/34 |
| 2009/0054909 A1 | | 2/2009 | Farritor et al. | |
| 2010/0030233 A1 | * | 2/2010 | Whitman | A61B 34/30 606/130 |
| 2010/0307279 A1 | * | 12/2010 | Campagna | B25J 15/04 74/490.05 |
| 2011/0109093 A1 | * | 5/2011 | Leininger | B25F 5/021 290/55 |
| 2012/0286730 A1 | | 11/2012 | Bonny | |
| 2013/0011215 A1 | | 1/2013 | Wells et al. | |
| 2013/0186261 A1 | | 7/2013 | May et al. | |

\* cited by examiner

| SRIT APPLICATION | | |
|---|---|---|
| Joint Architecture for Unmanned Systems (JAUS) | | |
| UDP/IP | | Other Transport and Network Layers |
| Ethernet | 802.11 b,g | JTRS Cluster 5 | Other RF Waveforms |

Fig. 1

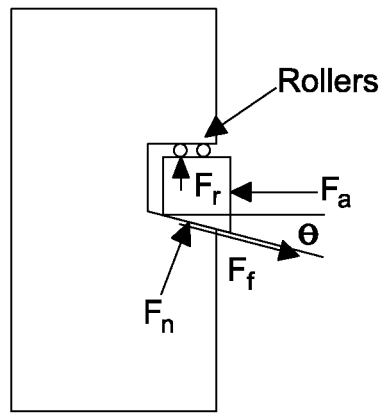

Θ = Slope Angle $F_a$ = Applied Force $F_r$ = Reaction Force $F_f$ = Friction Force $F_n$ = Normal Force It is known that:
$F_f = \mu F_f$
where $\mu$ is the coefficient of friction.

It can be shown that:
$$F_r = \frac{F_a(\mu \sin\Theta + \cos\Theta)}{(\sin\Theta + \mu\cos\Theta)}$$

For small angles of Θ, this can be approximated by:
$F_r \cong F_a/\mu$

For example, if $\mu = .2$ and $F_a = 80$ pounds, then $F_r = 400$ pounds.

Fig. 11

Similarly, for a two stage wedge, it can be shown that:
$F_r \cong F_a/\mu^2$ for small angles of $\theta$ For example, if $\mu = .2$ and $F_a = 80$ pounds, then $F_r = 2000$ pounds.

DEFENSE RELATED ROBOTIC SYSTEMS

CROSS REFERENCE TO RELATED APPLICATIONS

This application is a divisional application of U.S. patent application Ser. No. 12/167,735, filed Jul. 3, 2008 and entitled "Defense Related Robotic Systems", which claims priority to Provisional U.S. Application No. 60/958,405, filed on Jul. 5, 2007 and entitled "Defense Related Robotic Systems", the disclosures of which are hereby incorporated by reference in their entirety.

BACKGROUND OF THE INVENTION

Field of the Invention

This application relates to a robotic system having a movable robotic arm and, more specifically, to a robotic system having a movable robotic arm with a quick-release assembly for connecting a tool to the robotic arm.

Description of the Related Art

Robotic arms often require specialized configurations to accomplish their particular missions. Such configuration could involve changing the length of a link in the arm or attaching a different end effector or tool. (Henceforth, we will refer to making any of these changes as changing the tool.) Generally, these changes would require a technician to remove the current tool and to attach its replacement. This may involve physically disconnecting the tool, disconnecting electrical connections, physically attaching the new tool, and hooking up its electrical connections. The system may also require reconfiguring the control software for each specialized tool. However, in certain areas such as military or civilian Explosives Ordinance Disposal (EOD), this process is too time-consuming and interferes with the time constraints imposed by their urgent mission. Thus, in some scenarios there exists a need to quickly change tools.

Tools that attach to links of the robotic arm that are pivoting or rotating must be able to withstand the large bending movements and torques that result from this. To allow for inexpensive tools (by removing the motor and motor controllers), tools may require a source of mechanical power to drive the tool, such as a rotating shaft. However, some tools may require additional motors, processors, or sensors so connections for electrical power and electrical control signals are also required. The control software may require electrical connections from the tool to convey sensor information from the tool, as well as information which identifies the tool that is currently attached. Because of the need to change tools quickly, it would be ideal if no additional tools were required by the robot operator to change the robot's configuration.

Military and law enforcement groups are increasingly relying on Unmanned Ground Vehicles (UGVs) to perform life-threatening tasks ranging from under car inspection to EOD. As small UGVs, such as Omni-Directional Inspection Systems (ODIS), Talon and Packbot, have gained acceptance, the variety of tasks they have been required to perform has increased.

Heretofore, when a new candidate task is identified, the typical response has been to design and build a new robot intended to perform the specific task. Sometimes existing UGV platforms are used, but just as often a new robot is created to specifically address the task. This has resulted in a proliferation of small UGVs, each performing admirably on tasks within each of its subset of core competencies, but is generally unsuitable for tasks that vary too widely from its essential purpose. It is impractical to expect field teams to carry multiple UGVs, each suited for a specific task. In addition to the strain on the physical resources of the field team (e.g., transportation and maintenance), different robots come with different control schemes. This reduces the ability of the operator to capitalize on the experience and intuition gained from operating previous robots, because the operator cannot rely on the trained reflexes developed while controlling previous robots. In fact, these differing control schemes lead to operator errors and inefficient control.

Another approach has been to design new, more capable robots, but this approach has drawbacks because even if a robot were designed and built to perform all of the tasks currently assigned to UGVs, it would quickly become outdated as new tasks and jobs are identified. Additionally, external variables, such as physical environment, make UGVs designed for one environment wholly impractical for use in another environment, meaning a number of new robot types would need to be designed, tested, and built.

SUMMARY OF THE INVENTION

Accordingly, it is an object of the invention to provide a robot quick-release assembly including a first joint member, having a cylindrical body, and a robot component mounted thereon, the first joint member having a first coupler; and a second joint member, having a cylindrical body, a robot arm mounted thereon, the second joint member having a second coupler, a clamp, and a locking collar, wherein the first coupler is coaxially aligned with the second coupler and pressed into the second joint member, and the first joint member is detachably connected to the second joint member.

Another object of the invention is to provide a quick-release assembly where the first coupler has at least one member extending radially outward circumferentially spaced on a first end of the first coupler. The clamp has a first member on a first end, fingers extending inward and spaced circumferentially around the clamp on a second end, and an externally threaded surface, the fingers having an outside slanted surface, a first inside slanted surface, and a second inside slanted surface, and the second coupler having a cylindrical body defining a ring having a slanted surface having at least one member extending radially outward, and having a slanted surface at an end adjacent the ring, the collar having a cylindrical body with an axial bore defining an inwardly slanted surface on a first end and an internally threaded portion at a second end thereon. The locking collar is fitted over the second joint member and is rotated pressing the threaded portion of locking collar into engagement with the threaded portion of the clamp. The member of the first coupler is rotated into engagement with the member of the clamp, the slanted surface of the locking collar is pushed into engagement with the outside slanted surface of the finger of the clamp, the member of the second coupler is pushed into engagement with the first inside slanted surface of the clamp, the surface of the ring is pushed into engagement with the second inside slanted surface of the clamp, and the member of the first coupler is pulled coaxially into the member of the clamp.

A further object of the invention is to provide a quick-release assembly where the clamp further includes a guide, slidably attached between the fingers, the guide having a pin movably attached therethrough. The locking collar can include a notched surface for engagement with the locking pin, the notched surface having a slanted end. Additionally, the first coupler includes a notched surface for engagement with the locking pin, the notched surface having a slanted end. The notched surface of first coupler and the notched surface of the locking collar align and the slanted end of the notched surface of the locking collar pushes the pin into notched surface of the first coupler when the locking collar is rotated. When the notched surface of the first coupler and the notched surface of the locking collar align, the slanted end of the notched surface of the first coupler pushes the pin into the notched surface of the locking collar when the locking collar is rotated.

Still another object of the invention is to provide a quick-release assembly wherein the slanted surface of the first coupler has at least one inward opening defining a notch corresponding to a boss extending outward from an end of the second coupler. When the first member and the second member are engaged to form an electrical connection operative to transmit images, control signals, additional electrical power, activators, identification information, video, USB, TCP/IP, UDP, or CANBus, the first joint member can have electrical connector terminals and the second joint member having engaging holes, whereby the electrical connector terminals are joined to the engaging holes to form a connection. The components for use can include one of a manipulator arm, a boom arm, a stick arm, a gripper, a Gimble grip, a flexible joint, a tilt table, a dozer, a shovel, a plow, a pan tilt table, or a digger.

Another object of the invention is to provide a quick-release assembly where the coupling assembly further exerts large forces with the application of a relatively small torque to the locking collar.

Still another object of the invention provides a robot arrangement that includes a quick-release coupling assembly including a first joint member mounted on a robot component having a first coupler and a second joint member mounted on a robot arm having a second coupler, a clamp, and a locking collar, wherein the first coupler is connected to the second coupler, a robot arm attached to the second coupler, a chip embedded in the robot component, a connection from a tool to a control unit, and an identification signal, whereby the embedded chip transmits an identification of the robot component to a control unit through the connection. The control signal is operative to control a robot component, the control signal is transmitted from the control unit to the robot.

A further object of the invention is to provide a quick-release assembly including a first joint member mounted on a robot component, the first member including a first coupler and a second joint member mounted on a robot arm, the second member including a second coupler, a clamp, and a locking collar. When first coupler is pressed onto the second coupler, and the collar is rotated to attach the first joint member to the second joint member in a two stage connection. The quick release coupling assembly can further include a sequencing guide and a pin.

A further object of the invention is to provide a quick-release assembly including a first joint member, having a cylindrical body, and a robot component mounted thereon, the first joint member having a first mechanical coupler and a second joint member, having a cylindrical body, a robot arm mounted thereon, the second joint member having a stick and power assembly, the stick having a second coupler, where the first coupler is coaxially aligned with the second coupler and pressed into the second coupler, and the first coupler is detachably connected to the second coupler for transferring power across the quick-release assembly. The power assembly is placed in a proximal end of the second joint member to reduce the moment of inertia. The robot component can receive all mechanical power from the driveshaft or can have an additional electrical connector, the additional electrical connector supplying power source to activate the robot component. The assembly can include more than one source of power for tools having need, further including a mechanical power assembly, the power assembly supplying a second power source to a robot component.

The present invention includes a method for connecting a robotic tool to a robotic arm, including the following steps of providing a quick-release coupling assembly including a first joint member mounted on a robot component having a first coupler and a second joint member mounted on a robot arm having a second coupler, a clamp, and a collar, wherein the first coupler is connected to the second coupler, the first coupler has at least one member extending radially outward circumferentially spaced on a first end of the first coupler from an end of the first coupler, the clamp having a first member on a first end, fingers extending inward and spaced circumferentially around the clamp on a second end, and an externally threaded surface, the fingers having an outside slanted surface and a first inside slanted surface and second inside slanted surface, and second coupler having a cylindrical body defining a ring having a slanted surface, and having at least one member extending radially outward and having a slanted surface at an, end adjacent the ring, the collar having a cylindrical body with an axial bore defining an inwardly slanted surface on a first end and an internally threaded portion at a second end thereon. Pushing notches on a female coupler onto bosses in the male coupler displacing a male coupler into the clamp; rotating the locking collar, thereby turning the locking collar and the clamp as one unit and rotating the fingers directly over the member of the male coupler; aligning a sequencing guide and a sequencing pin to lock the clamp to the female coupler and releasing it from the locking collar; moving coaxially the clamp into engagement with the locking collar by rotation of multi-thread of locking collar into a multi-thread of the clamp, threadably moving the fingers inward in a first stage wedge; and pushing inward, the fingers on the members of the second coupler, thereby causing a second stage wedge, causing the clamp to move down relative to the first coupler.

BRIEF DESCRIPTION OF THE DRAWINGS

FIG. 1 is a block diagram showing a communications network for a Small Robot Infrastructure Toolkit (SRIT) application;

FIG. 11 is a conceptual illustration of an example of a Second-Stage Wedge;

DESCRIPTION OF THE PREFERRED EMBODIMENTS

The object of the present invention is to provide a quick-release assembly for quickly separating tools and effectors mechanically from their manipulator arms, thus allowing easy integration of future tools and effectors as the complexity of the system is contained in the manipulator arms. It is still a further object to make the tools essentially simple line replaceable units that can be easily replaced when they fail.

The quick-release assembly provides a connection easily connected and disconnected having full pass through power, electrical, and signal capabilities. The present invention utilizes a modular software approach, shown in FIG. 1. Using the stack analogy, at the bottom of the software stack, communication is accomplished by UDP/IP and others such as by Ethernet 802.11b,g, and the Joint Tactical Radio System (JTRS) cluster 5 or other RF wave forms. The Joint Architecture for Unmanned Systems (JAUS) layer relies on these transport and network layers for communication. JAUS is designed to be modular and can accommodate using various different communication methods.

The Small Robot Infrastructure Toolkit (SRIT) relies on JAUS, and its design is not tied to any one technology for communications. For example, the cluster 5 JTRS, which supports an IP interface, can easily be inserted as a component of the SRIT. The communication protocol that is used by JAUS is transparent to SRIT design.

Figure 2:
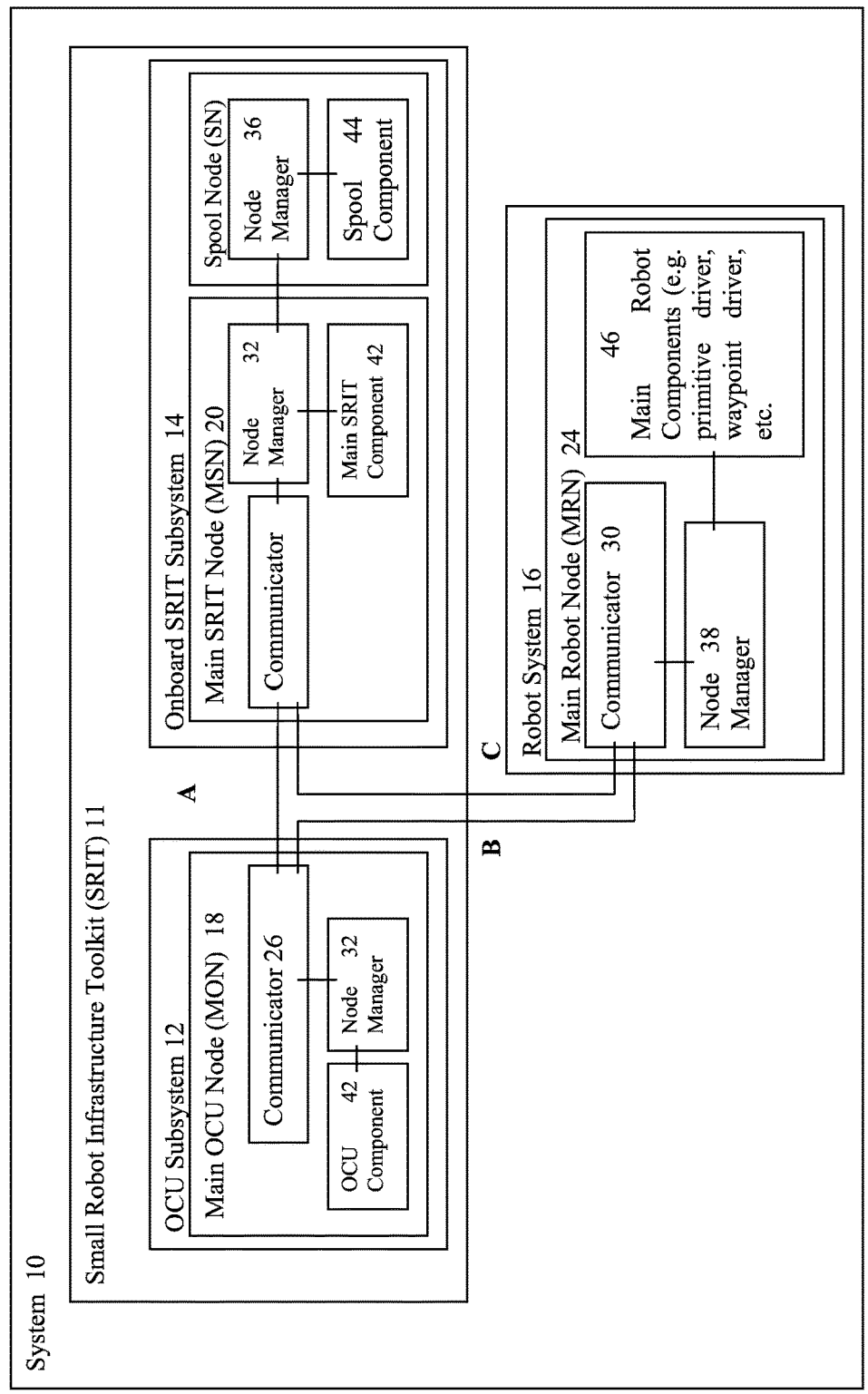
FIG. 2 is a main flow chart showing the operation of the computer software for a SRIT.

With reference to FIG. 2, a system 10 is an example of a robot system using JAUS. The system 10 is a collection of subsystems each using JAUS to define a hierarchy of elements. Within the subsystems are computer processors which act as nodes. Within the nodes are components which are software processes executing on a node. System 10 includes an Operator Control Unit (OCU) subsystem 12, an onboard SRIT subsystem 14, and a robot subsystem 16. Within each subsystem is a main node, the OCU subsystem 12 having an OCU node 18, SRIT subsystem 14 having an onboard node 20, and robot subsystem 16 having a robot node 24. With regard to the onboard SRIT subsystem 14, a spool node 22 is an optional node. A SRIT 11 is the infrastructure for the toolkit and encapsulates the tools and operator controls while the actual robot infrastructure is handled externally. The tools can therefore be used with any robot since this is a portable infrastructure. Although the present invention is described having robot subsystem 16, one skilled in the art could utilize SRIT 11 with other robot systems.

Within each node of the subsystems are communicators. For example, a communicator 26 of OCU node 18, a communicator 28 of onboard node 20, and a communicator 30 of robot node 24 are present in the subsystems. Nodes 18, 20, and 24 communicate between subsystems over communicator links A, B, and C. Communicators also communicate with their associated node managers. Each node has a node manager which manages components of that node. OCU node 18 includes a node manager 32, which manages an OCU component 40. Onboard node 20 includes a node manager 34, which manages a SRIT component 42. Spool node 22 includes a node manager 36, which manages a spool component 44. Robot node 24 includes node manager 38, which manages a robot component 46.

With continuing reference to FIG. 2, robot node 24 of FIG. 2 includes robot components 46. Robot components 46 comprise software for a primitive driver and a way point driver. There can be multiple instances of components but in most applications there is only one instance of any given component.

Communicators 26, 28, and 30 and node managers 32, 34, and 38 can be viewed simply as routers of messages, which are sent between component instances. Messages are organized into classes. A command class defines messages which can cause an action to be performed upon receipt. A query class defines messages which can cause a component to ask another component for information. The inform class defines messages for responding to query messages and also contains the data set that fulfills the query message. A component can also send an inform class message to another component without being queried. There are also message classes to handle event set-up and notification. If the current message set does not provide the functionality required for a specific application, user defined messages can be employed.

With continuing reference to FIG. 2, communicator 26 of OCU node 18 is the portal for all messages entering and leaving OCU subsystem 12, and node manager 32 is the portal for all messages entering and leaving OCU component 40. When OCU component 40 sends a message to robot component 46, the message travels to node manager 32, after node manager 32 determines the message is for a component which is not part of its subsystem 12, and then node manager 32 relays the message to its communicator 26. Communicator 26 similarly determines routing and relays the message to an appropriate communicator 30 via link C. On receipt, communicator 30 reads the routing information of the message and sends the message to node manager 38. Node manager 38 determines the message is for robot component 46 and sends the message to robot component 46.

Figure 3:
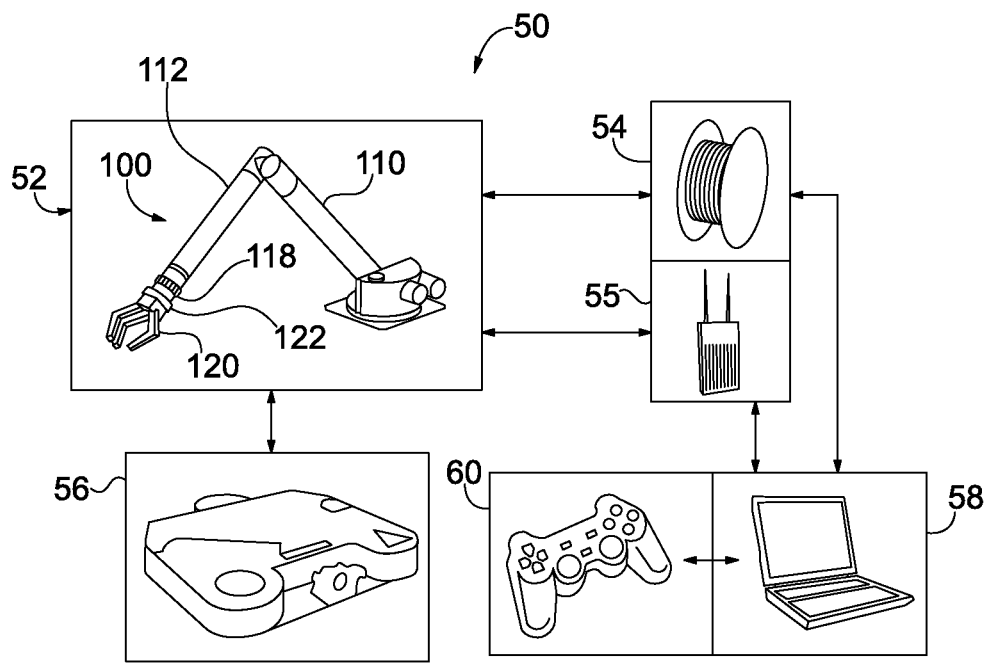
FIG. 3 is an illustration of the components of a SRIT system.

With reference to FIG. 3, a SKIT system 50 is shown including a manipulator tool 52, an OCU 58 and a controller 60. As shown in FIG. 3, there are two communication modes utilized to link system 50 to OCU 58 and controller 60 which can be arranged on a robot 56. However, one skilled in the art may utilize other robots or components, and this invention is not meant to be limited by the type of robot or software running thereon. Different communication nodes can be utilized to link system 50, OCU 58, and controller 60.

A spool of fiber optic cable and a radio frequency link 55 are several non-limiting examples.

Figure 4:
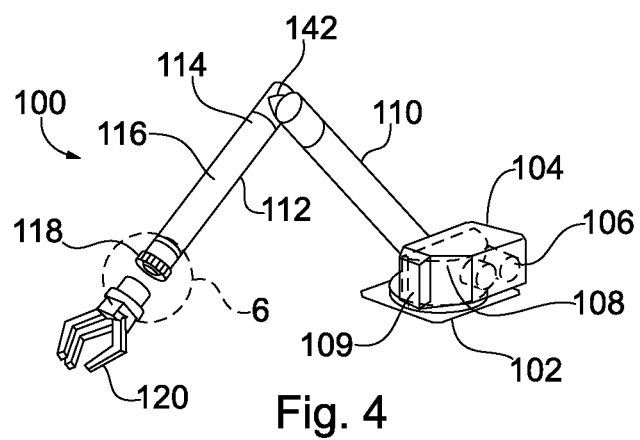
FIG. 4 is an illustration of a robot having an arm described in the present invention.

With reference to FIG. 4, a manipulator arm 100 for a robot includes a base 102, a motor cover 104, a stick motor 106, a boom motor 108, and also an optional swing motor 109. The arm 100 further includes a boom arm segment 110, a stick arm segment 112, and a joint 142 connecting the boom arm segment 110 to stick arm segment 112. Included within the stick arm segment 112 is a power take off (PTO) motor 114 and a PTO shaft 116 to pass power to the gripper tool 120.

A quick-release assembly 118 is included on the stick arm segment 112 opposite joint 142 at one end. The quick-release assembly 118 forms a connection to gripper 120.

Figure 5:
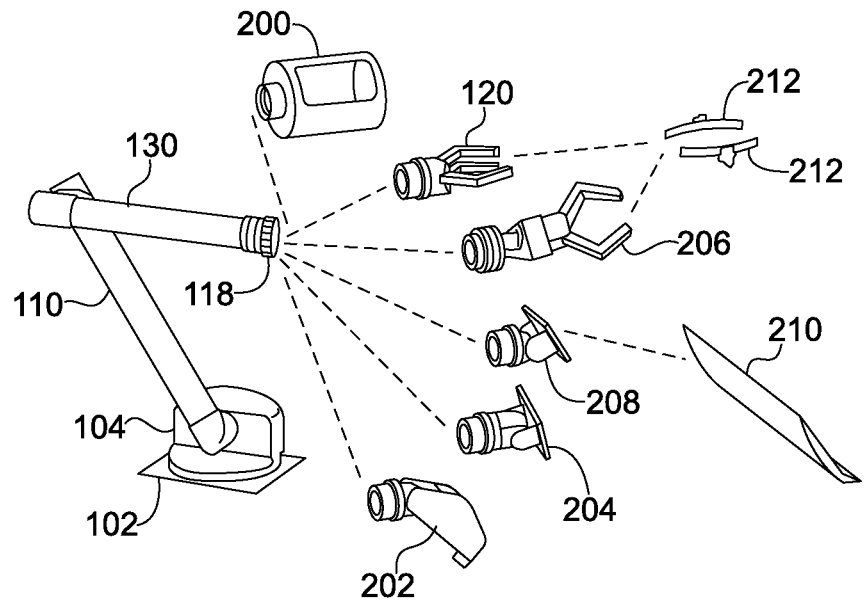
FIG. 5 is an exploded view of a manipulator arm of the present invention.
Figure 9:
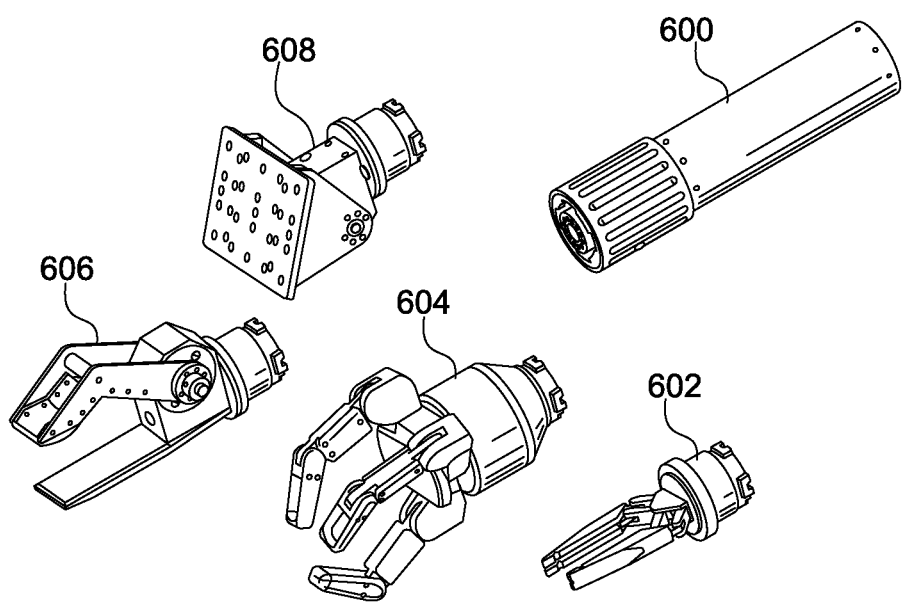
FIG. 9 is a detailed view of quick disconnect tools along with a tool mechanical coupler.

With reference to FIG. 5, with like numbers for like parts, components that can be attached to the quick-release assembly 118 are shown, they include a retrieval delivery device 200, used for transporting goods on the robot; a gripper 206, which can be combined with a Gimble Grip insert 212 to act as a flexible joint tool for lifting or pushing objects; the gripper 206, shown having a rolling or tilting wrist; a tilt table 208, which can be used with other tilting tools; a dozer shovel 210, which can act as a plow; a pan tilt table 204, which can pan; and a digger 202 for digging or lifting. In FIG. 9, additional components are shown, including arm 600, gripper 602, gripper 604, gripper 606, and tilt table 608.

The quick-release assembly of the present invention facilitates quick connection and release of the components of FIG. 5. When changing components, the SRIT operates seamlessly since they are plug-and-play. The OCU can identify the current component and the current hand controller by reading an embedded chip in order to adapt the software applications to the identified tool and hand controller. The embedded chip contains a unique identifier for each particular tool.

When a new tool is attached to the manipulator arm, the unique identifier for the tool is read by the main SRIT node 20 (FIG. 2) of the onboard SRIT subsystem 14 of the SRIT 11. Node 20 relays the tool identification information to the OCU subsystem 12 via link A between communicator 28 and communicator 26. OCU component 40 is thereby adapted to control the new tool.

Software adaptation also requires updating both the OCU display screen and the function mapping on the current hand controller. The OCU help screens can also be adapted to provide help screens on the OCU for both the hand controller and the tool currently attached. One button on the hand controller will always pull up a context sensitive menu. The help button provides a help menu on the OCU screen for informing the operator how to properly operate the current tool with the current hand controller.

Figure 13:
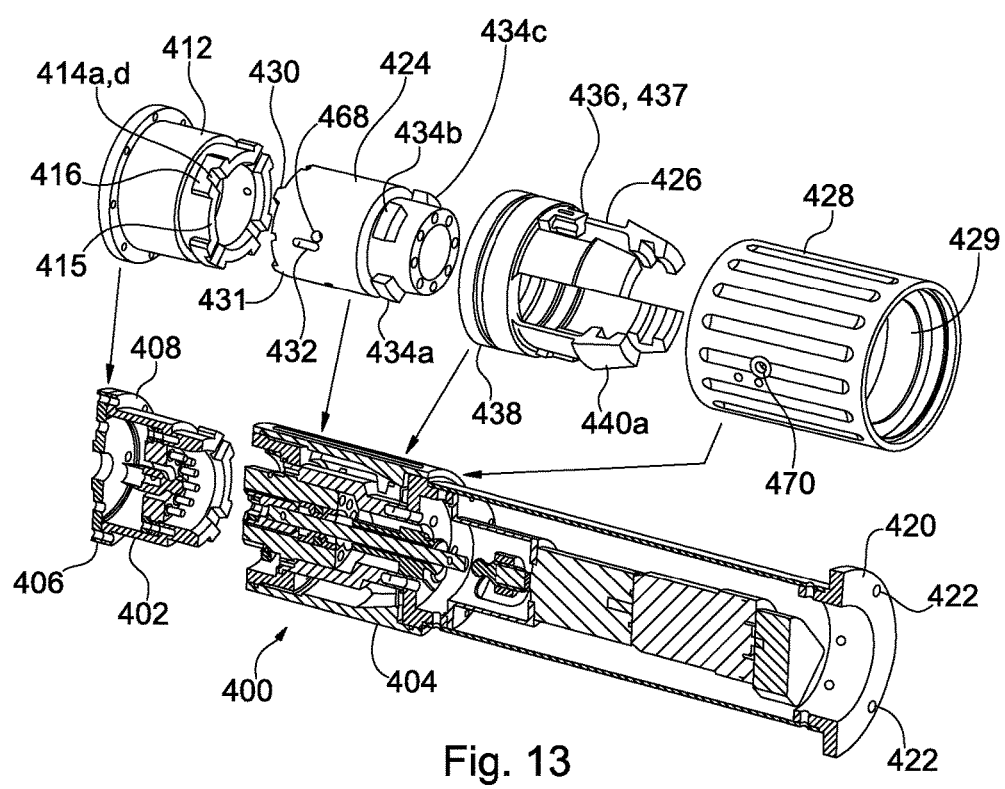
FIG. 13 is a cross-sectional view of a quick-release assembly showing an exploded side-perspective view of the mechanical coupler components contained therein.

With reference to FIG. 13, a quick-release assembly 400 according to the present invention includes a first joint member 402 to be mounted on a component, the components including the set of tools shown in FIG. 5, and a second joint member 404 to be mounted on a robot arm or robot body and coupled to the first joint member 402. The first joint member 402 is of a substantially cylindrical shape including a flange 406 that can have a plurality of insertion holes 408 extending in the axial direction thereof. The first joint member 402 contains a female coupler 412 therein.

The second joint member 404 is also of a substantially cylindrical shape including a flange 420 and one axial end thereof and having insertion holes 422 extending in the axial direction thereof. The mechanical components of second joint member 404 contain a male coupler 424, a clamp 426, and a locking collar 428.

Locking collar 428 has a substantially cylindrical body defining an axial bore 429. The collar 428 has a pin hole 470 therethrough. The axial bore 429 of locking collar 428 has a stepped surface that defines a slanted or tapered surface 460 and a multi-thread 462. The locking collar 428 has grooves 464 on an internal surface of the axial bore 429. The grooves are circumferentially spread about the locking collar 428.

The quick-release assembly 400 is connected by fitting a proximal mating end 415 of female coupler 412 of the first joint member 402 into the proximal corresponding male coupler 424. As shown in FIG. 13, the first and second joint members 402, 404, respectively, are positioned in axially confronting relation and displaced toward each other. When displaced together, mating notches 414a through 414d of female coupler 412 engage mating bosses 430a through 430d of male coupler 424, and the male coupler 424 and female coupler 412 can be further displaced in tandem further into the larger diameter clamp 426 of second joint member 404. As the male coupler 424 and female coupler 412 are displaced into the second joint member 404, they engage the clamp 426.

Figure 14A:
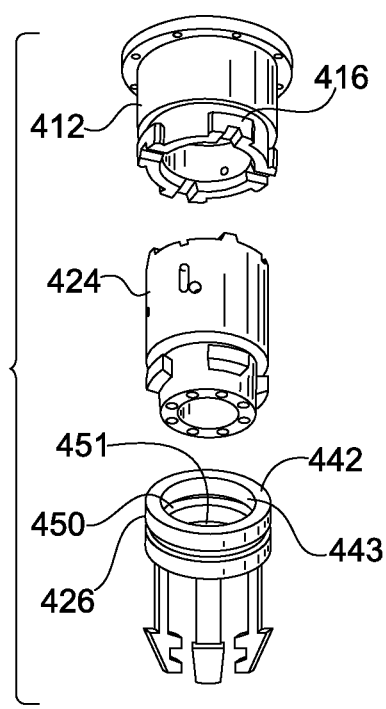
FIG. 14a is a exploded side-perspective view of the mechanical coupler components of the quick-release assembly of the present invention.
Figure 14B:
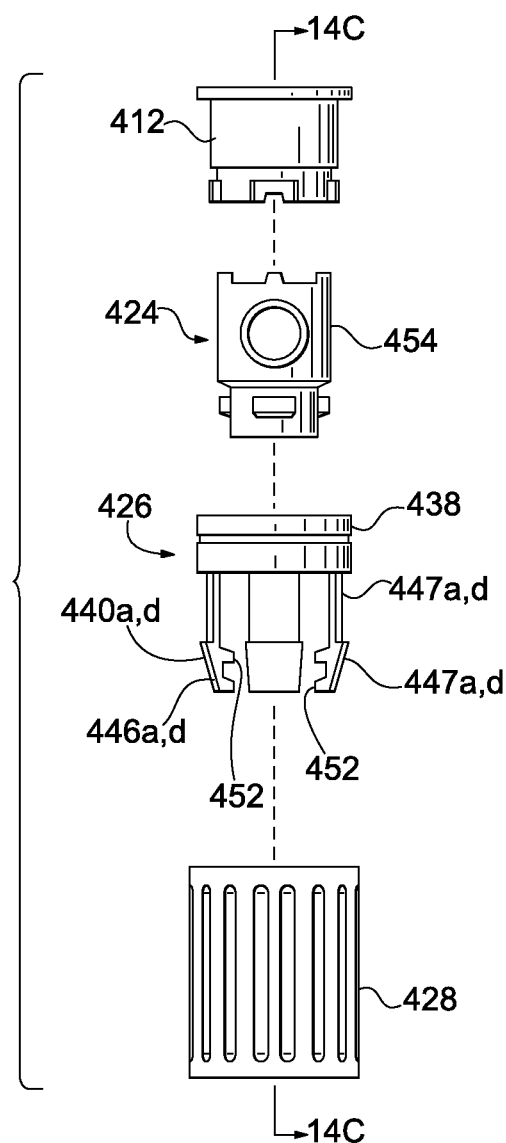
FIG. 14b is an exploded side-perspective view of the mechanical coupler components of the quick-release assembly of the present invention.
Figure 14C:
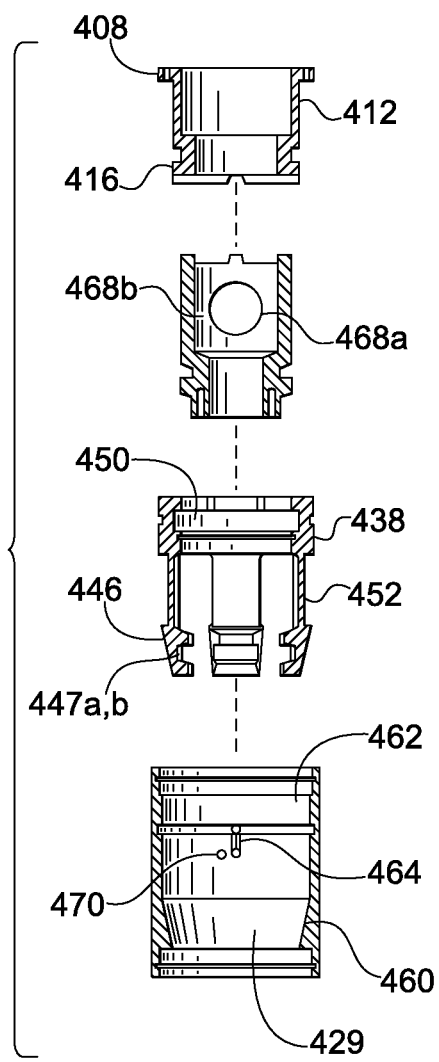
FIG. 14c is a cross-sectional view of an exploded side-perspective view of the mechanical coupler components of the quick-release assembly of the present invention.

With reference to FIGS. 14a through 14c, like numbers are used with like parts. The female coupler 412, the male coupler 424, and the clamp 426 of the quick-release assembly 400 are shown in exploded views showing the details of the components. FIG. 14c shows cross-sectional views along lines A, B, C, and D, respectively, of FIG. 14b. Clamp 426 has a stepped hole 450 defined centrally therein and includes a plurality of radially inwardly projecting members, teeth 440a through 440d in a smaller diameter portion of the stepped hole 450. The teeth 440a through 440d are circumferentially equally spaced and have respecting outer engaging surfaces 446a through 446d slanted downwardly and radially inward toward the center. The teeth 440a through 440d also define two inward engaging surfaces. Inner engaging surfaces 447a through 447d of teeth 440a through 440d, respectively, are tapered or slanted radially inward toward the axis. Second inner engagement surfaces 452a through 452d of teeth 440a through 440d, respectively, are also tapered or slanted radially inward toward the axis.

The stepped hole 450 is defined centrally in a larger diameter portion 451 of the clamp 426, the top of which defines the inwardly projecting teeth 442a through 442d spaced equally circumferentially about the clamp 426 and forming an equal amount of voids 443a through 443d.

With reference to FIG. 14b, the male coupler 424 has a plurality of equally circumferentially spaced members in the form of coupler teeth 434a through 434d projecting radially outwardly from an outer circumferential surface at one end thereof. Coupler teeth 434a through 434d during the connection process can be positioned for engagement with the clamp teeth 440a through 440d, respectively, of clamp 426. The coupler teeth 434a through 434d have engaging surfaces 433a through 433d, respectively, tapered or slanted complementary to the surfaces 447a through 447d, respectively, of the clamp teeth 440a through 440d. The outer periphery of the coupler teeth 434a through 434d jointly define an imaginary circle, the diameter of which is smaller than the diameter of the larger diameter portion of the stepped hole 450.

The male coupler 424 has a stepped outer surface defining a circumferential ring 454 which projects radially outward from a smaller diameter portion of male coupler 424. The ring 454 includes an engagement surface 456 slanted complementary to the slanted surfaces of the second inner engagement surfaces 452a through 452d of clamp 426.

With reference to FIGS. 13 and 14a through 14c, the first joint member 402 is displaced toward second joint member 404. First, mating notches 414 of female coupler 412 are engaged with mating bosses 430a through 430d of the male coupler 424 causing the two pieces to rotate in tandem. Then, female teeth 416a through 416d are fitted through voids 443a through 443d of clamp 426 and teeth 442a through 442d of clamp 426 engage teeth 416a through 416d of female coupler 412 when the female coupler 412 is rotated. With continued displacement and rotation, sequencing pins 437a through 437b become aligned and continued rotation causes them to eject from the locking collar 428, sequencing groove 464, and become engaged in the male coupler 424 sequencing groove causing the clamp 426 to attach to the male coupler 424/female coupler 412 arrangement (discussed in detail hereinafter). Now, since the male coupler 424 is now engaged to the clamp 426, neither the female coupler 412 nor the male coupler 424 can rotate. However, as the locking collar 428 is rotated angularly about its axis, an internally threaded portion 462 of locking collar 428 (see FIG. 14c) engages a multi-threaded portion 438 of the clamp 426 and a locking collar 468 and the clamp 426 are moved coaxially together in opposite directions, causing a sloped surface 460 on the internal side of locking collar 428 to engage slanted surfaces 446a through 446d on the teeth 440a through 440d, respectively, creating a wedging action when slanted surfaces 435a through 435d of teeth 434a through 434d of the male coupler 424 engage surfaces 447a through 447d of clamp teeth 440a through 440d and the engagement surface 456 of ring 454 engages surfaces 452a through 452d, thereby causing the pieces to move coaxially in relation to one another and into a connected position.

Figure 10:
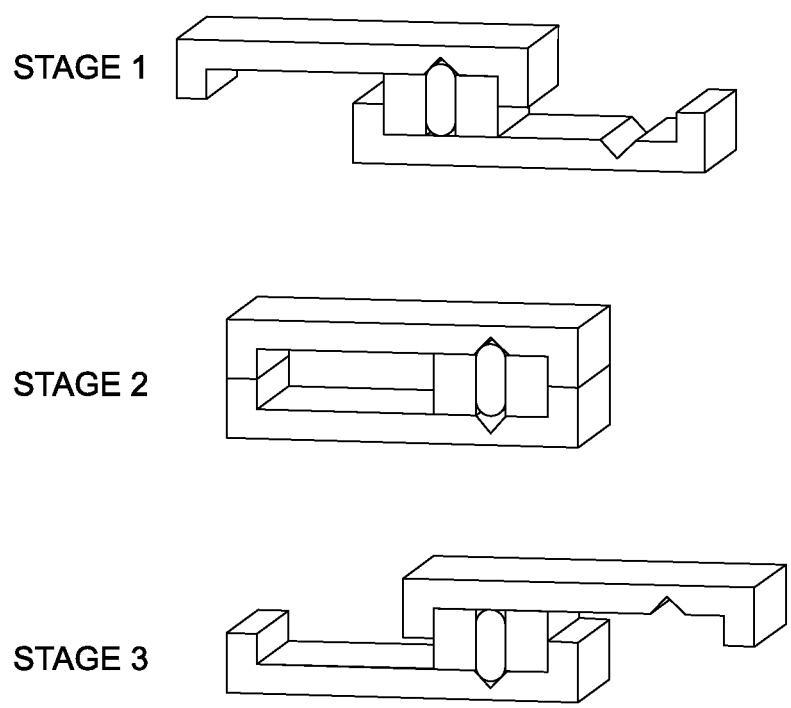
FIG. 10 is a conceptual illustration of an example of a Single Stage Wedge.

With reference to FIG. 10, an example of the sequencing pin and groove is shown using a linear approach of components for a single hand, one motion clamping device. As shown, there are three positions. In the first position, Member A begins moving to the right. Member C is mechanically forced to move with A along Member B. In the second stage, Member C is reaching the end of travel on Member B and strikes the stop. Triangular grooves in Members A and B are now aligned. Pin D is free to move between triangular grooves of A or B. Continued movement of Member A causes the Pin D to transfer to triangular groove in Member B. In the third position, Member A continues to limit the travel against Member C. Reversing the direction of motion of Member A causes the sequence to happen in reverse order.

With reference to FIG. 13, a sequencing system, similar to the linear system described hereinabove, is utilized by the quick-release assembly 400 to limit the rotation and to control the coaxial movement between components. Clamp 426 has sequencing slides 436a and 436b having sequencing pins 437a and 437b attached in a hole therethrough (not shown). The sequencing slides 436a and 436b can be displaced outwardly on both the externally facing surface and the internally facing surface of the slides 436a and 436b. The sequencing pins 437a and 437b can engage the internally facing sequencing groove 464 in the locking collar 428 when the quick-release assembly 400 is in the release position. Rotation of the locking collar 428 about its axis with the pins 437a and 437b engaged also rotates the clamp 426 in tandem in the release position. The male coupler 424 has an externally facing sequencing groove 432. The pins 437a and 437b can engage the sequencing groove 432 when the quick-release assembly 400 is in the connect position. The sequencing pins 437a and 437b engage the sequencing groove 432 when the locking collar 428 is rotated about its axis. In connect position the clamp 426 is coupled to male coupler 424, and locking collar 428 can continue to rotate causing the engagement and connection to finish as discussed hereinabove. When in the aligned position, the pins 437a and 437b are free to move from either groove 432 to groove 464 depending on the direction of the rotation. Each groove 432, 464 contains a slightly tapered surface (not shown) which determines the movement of pins 437a through b when rotation occurs similar to the linear arrangement in FIG. 10, the pins 437a through 437b are pushed out from one hole and into the other.

Fixed pins (not shown) can also be used to stop rotation at a fixed point. Fixed pins can be placed circumferentially spaced about the male coupler 424 in holes 468a through 468b of the male coupler 424 (additional holes 90° apart not shown) and in circumferentially spaced holes 470 of locking collar 428. (Not shown are corresponding holes, located 180° apart.)

Figure 12:
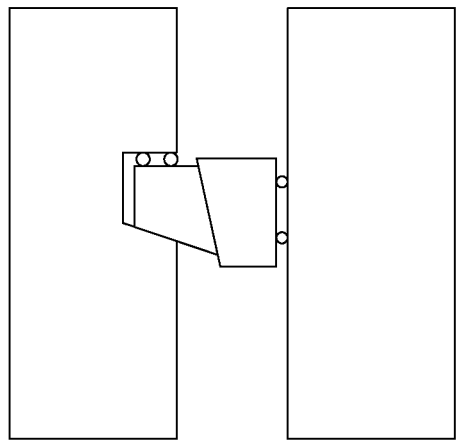
FIG. 12 is an exploded view of the mechanical coupler components therein.

With reference to FIGS. 11 through 12, a conceptual model of a second-stage wedge mechanism is shown. As shown, by combining the applied force with friction, a strong friction force can be attained. In the first example, a first-stage wedge using the friction force for a friction force of 400 pounds is attained from an applied force of 80 pounds. In the second example, a second-stage wedge is shown to be a force of 2000 pounds from the same 80 pounds of applied force (FIG. 12). The present invention uses the latter to provide strength in its connection.

As discussed previously, interaction of an internal multi-thread 444 of locking collar 428 with the external multi-thread portion 438 can move the locking collar 428 and clamp 426 coaxially by rotating the locking collar 428 and forcing the teeth 440a through 440d inward when they engage the surface 446a through 446d. A first-stage (as discussed) wedged engagement is created while a second stage (as discussed) wedged engagement is created when the surfaces 435a through 435d of the teeth 434a through 434d, respectively, of male coupler 424 engage the inner surfaces 447a through 447d of clamp 426 and the surface 456 of ring 454 engages second inner surfaces 452a through 452d of clamp 426.

The slanted surfaces of the present invention provide engagement strength. The angular rotation forces the teeth into the first and second stage wedge engagements and also provides multiplicative force for the quick-release assembly 400 giving it powerful strength without detracting from its use or adaptability.

Figure 15:
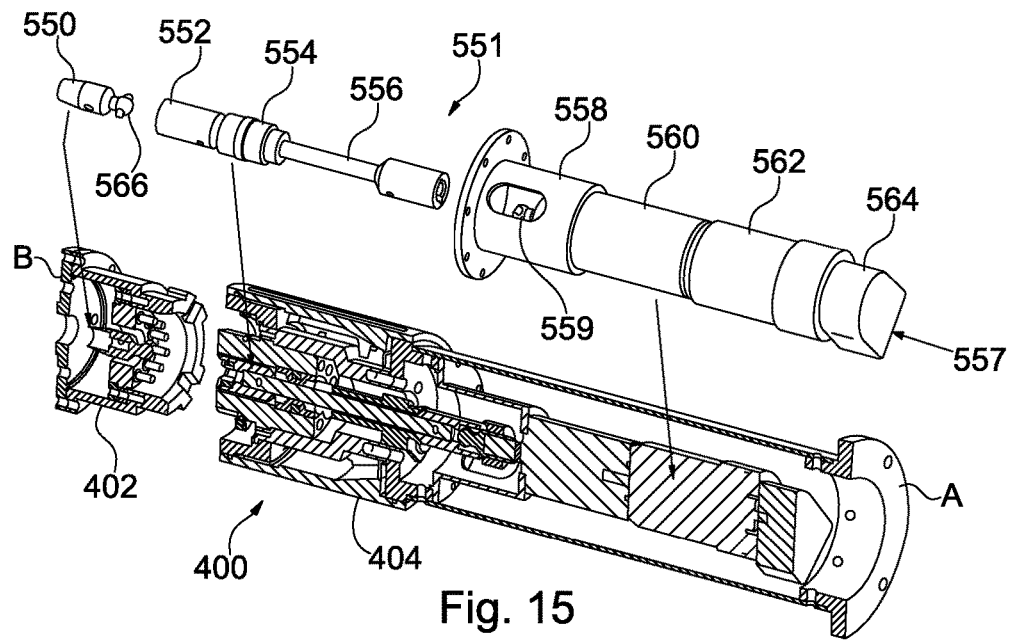
FIG. 15 is a cross-sectional view of the quick-release assembly showing exploded side-perspective views of power take off drive components therein.

With reference to FIG. 15, a quick-release assembly 400 is shown, with like numbers for like parts. PTO mechanical drive components are contained within the quick-release assembly 400 to allow transfer of mechanical power from the robot arm to component tools connected to the robot arm, the quick-release assembly having a first joint member 402 having a male drive joint 550, and a second joint member 404 having a stick 551, and a power assembly 557. The first joint member having male drive joint 550, a substantially cylindrical joint with a mechanical coupler head 566, contained within the first joint member 402. Second joint member 404 includes the stick 551 and power assembly 557. The stick 551 has a self-aligning coupler, female drive joint 552 that can engage the coupler male drive joint half 550, engaging with the head 566, support bearings 554, and a driveshaft 556. The stick 551 engages with the power assembly 557. Power assembly 557 provides the power to rotate the driveshaft 556 of stick 551. Power assembly 557 has an adapter 558, a head 559, a gear box 560, a motor 562, and a position decoder 564. Power assembly 557 provides rotational force which rotates the driveshaft 556 of stick 551 when it is engaged with the rotating head 559. In turn, female drive joint 552, rotating, provides force to the male drive joint 550.

The position of power assembly 557 having relatively heavy components in the arm has a reducing effect on the moments of inertia for the quick-release assembly 400. Since the power assembly 557, and therefore a majority of the weight of the mechanical power system, is placed near the proximal end A of the quick-release assembly 400, the reduction in the moments allows smaller tool components to be used with the quick-release assembly 400 on the distal end B.

The mechanical PTO reduces the complexity of the tools because the power is provided from an external source. Therefore, tools can be attached and can receive power from the quick-release assembly 400 as long as they have the engagement head. Other tools can have power on board and can bypass the mechanical PTO system. Tools utilizing the PTO can be designed having no moving parts and are easy to maintain and replace.

Figure 16:
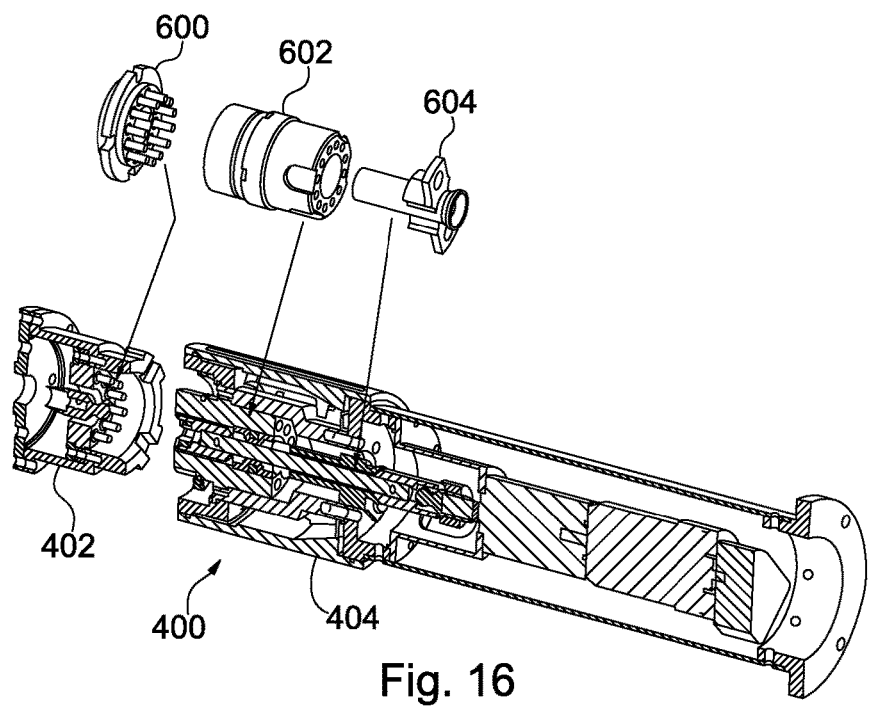
FIG. 16 is a cross-sectional view of the quick-release assembly showing exploded side-perspective views of electrical interface components.

With reference to FIG. 16, with like numbers for like parts, the quick-release assembly 400 is shown having the electrical interface components contained therein, including a male electrical connector 600, a female electrical connector 602, and a wire guide 604.

Figure 6:
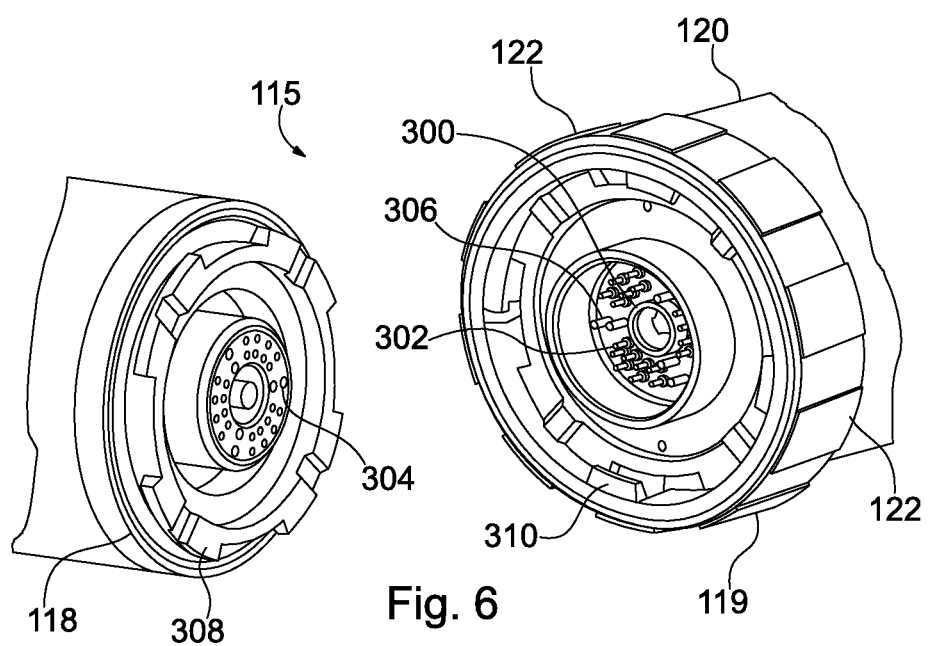
FIG. 6 is a detailed view of a quick-release assembly of FIG. 4.

With reference to FIG. 6, a second embodiment of electrical configuration of a quick-release assembly is shown. The quick-release assembly 115 includes a locking collar 122 and a power take off (PTO) 300, electrical connectors 302, and guides 306. The quick-release assembly 115 has electrical connectors 302 in a coupler 310 and signal holes 304 in a coupler 308. When engaged, couplers 310 and 308 are coupled. Guides 306 are provided longer than the electrical pins and serve to reduce damage.

The power and data signals required for the tool are passed through the center of the end of the arm via the male and female electrical connectors 600, 602, respectively. Tools having a single degree of freedom, receiving power from the mechanical PTO through the quick-release 400, a tool having two degrees of freedom uses the mechanical PTO power for the first degree of freedom and the electrical connectors pass power to drive a motor in the tool providing for the second degree of freedom.

The quick-release assembly 115 requires no tools, such as screwdrivers, wrenches, vices, for attachment and detachment. The quick-release assembly 115 uses mechanics to apply large torques during the attachment process and therefore creates a fit of the tool onto the end of the arm. This high torque apparition creates an extremely rigid connection between the tool and arm such that no flexing occurs while the tool is in use. This rigid design allows for more accurate usage of the tool. The connector design protects the signal against weather and premature failure. It allows the operator to swap end tools in the field without having any other tools, such as Allen wrenches, wrenches, or screwdrivers.

As shown in FIG. 5, a signal travels from the arm and connects with the tool using electrical connectors 302. The signal travels from the arm into the tool or from the tool back into the arm. The guides 306, which are longer than the electrical connections (pins) 302, are in place to prevent damage to the electrical pins. As tools are attached and detached from the end of the manipulator arm, the OCU interface adapts to match the current tool and the hand controller. During mapping the controller, buttons are remapped to match the current tool. Each pin can serve a unique purpose. For example, one pin can be used to pass identification information so that when connected, the device type is transparent. Additional pins can be used to pass electricity, images, control signals to motors, additional activators, or other purposes that may be needed by the specific tool.

Each tool contains detailed information about itself that is read in by the OCU which has no specific knowledge about any tool. Detailed information about each tool is embedded in a low cost memory chip or key. As a new tool is attached to the arm, the chip or key is recognized or sensed automatically by the SRIT software application. Next, the detailed tool information is read from a file stored on the chip or key. This approach allows any new tool to be developed and accepted by SRIT without modifications to the software. In one embodiment, Universal Serial Bus (USB) technology is used for interfacing the memory key. In another embodiment, Controller Area Network (CANBus) technology is used. However, the type of key or memory chip is not meant to be limiting to the invention, as one skilled in the art will readily recognize that numerous technologies exist to store information on a memory chip or key.

Figure 7:
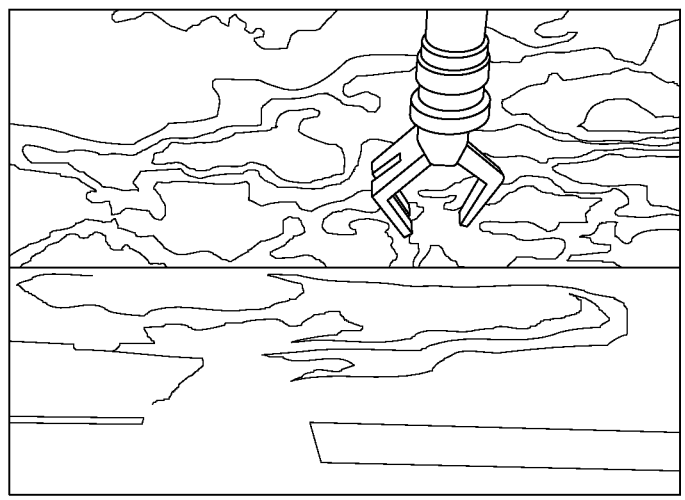
FIG. 7 is an illustration of a view from a robot utilizing the present invention.

With reference to FIG. 3, the hand controller 60 is shown communicating with the OCU 58. The OCU 58 is able to read the joystick and button inputs from the hand controller 60. The OCU translates the hand controller inputs into commands and sends a message to the manipulator 52 via the communication link, RF link 55 or a non-RF link 54. The command moves the manipulator 52 in real time based on the hand controller 60 inputs. The arm 100 having a quick-release assembly 118 and locking mechanism 122 is locked to the gripper tool 120. When the gripper tool 120 is locked to the stick arm segment 112, a connection is made in the quick-release assembly 118. The embedded chip of the gripper 120 contains the tool information for locking mechanism 122. The tool information of the gripper tool 120 is automatically extracted from the file contained on the embedded chip and the corresponding information is then transmitted in the form of a message to the OCU 58. The OCU 58, in turn, adapts its display and interpretation of the hand controller 60 commands to accommodate the current tool. The OCU 58 can then manipulate the arm 100 and the gripper 120. Feedback from the arm 100 is displayed in the OCU 58. The OCU 58 primarily features a camera view from the robot's perspective as shown in FIG. 7.

Figure 8:
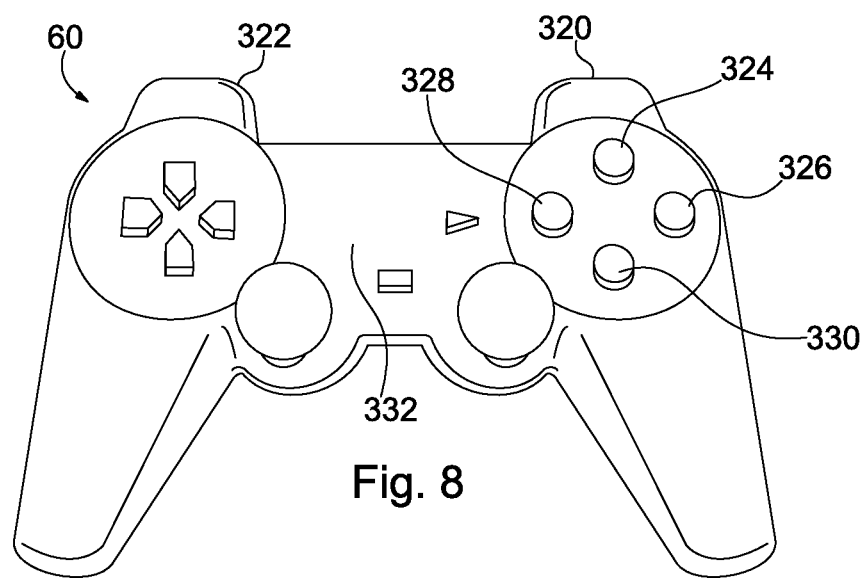
FIG. 8 is an illustration of a controller of the present invention.

With reference to FIG. 8, the controller 60 has keys with respective mappings to the gripper tool including: gripper open 322, gripper closed 320, tilt up 324, wrist left 328, wrist right 326, and tilt down 330. Help 332 has also been mapped and when the help button is pressed, the user will see a help screen for the gripper 120 on the OCU 58.

The modularity of the tool with the quick-release assembly 115 is shown in FIG. 6. The user can replace a component (not shown) by unlocking the first coupler 118 by rotating the locking collar 122 and displacing second coupler 119 apart from first coupler 118. This will cause the electrical connections and PTO to be disconnected. Afterward, any component can be connected, the chip or key of the new component is read by the SRIT, a file is passed to the OCU 58, and the controller 60 is re-mapped in order to correspond to the movements of the new component.

A method for opening and closing the device follows. Open position is such that the teeth in the clamp are not blocking the teeth on the male coupler. Once in the open position, this will allow the male coupler's teeth to pass between the teeth in the clamp and the grooves in the male coupler to fit onto the tangs on the female coupler. (Using your hand, turn the locking collar.) At first, this will turn the locking collar and the clamp as one unit, rotating the clamp's teeth directly over the male coupler's teeth. At this point, the sequencing pin changes position, in effect locking the clamp to, the female coupler and releasing it from the locking collar. Continued rotation of the locking collar now has the effect of moving the clamp down farther into the bore of the locking collar by means of a multi-thread between the locking collar and the clamp. The clamp's spring fingers are then pushed inward by the ramped walls ($1^{st}$ stage slope) of the locking collar. In turn, this inward motion of the clamp's spring fingers pushes the inner ramps ($2^{nd}$ stage slopes) against the ramps ($2^{nd}$ stage slopes) on the female coupler. This in turn causes the clamp to move down relative to the female coupler. This is the final motion which exerts a significant amount of force with the clamp's teeth on the male coupler's teeth holding them against the female coupler. The whole process will only require the locking collar to be turned roughly one-half rotation from fully open to fully locked on. The forces are calculated between approximately 2000 to 2500 pounds with the application of a 10 ft-lbs torque to the locking collar by hand.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A robot arrangement comprising:
   at least one robot component having a first coupler;
   a robot with a robot arm having a second coupler;
   a quick-release coupling assembly for connecting the first coupler to the second coupler, the quick-release coupling assembly including a first joint member mounted on the at least one robot component, a second joint member mounted on a robot arm, a clamp, and a locking collar;
   an operator control unit associated with the robot;
   a memory chip associated with the at least one robot component, the memory chip comprising identification information about the at least one robot component; and
   a communication interface for electrically connecting the at least one robot component to the robot arm,
   wherein the memory chip is configured to transmit identification information about the at least one robot component to the operator control unit via the communication interface when the at least one robot component is connected to the robot arm,
   wherein the identification information of the at least one robot component provides information to the operator control unit about the at least one robot component in order for the at least one robot component to be used and controlled;
   wherein the first coupler is coaxially aligned with the second coupler and pressed into the second joint member, and the first joint member is detachably connected to the second joint member,
   wherein the locking collar is rotatable relative to the first coupler, the second coupler, and the clamp,
   wherein the first coupler has at least one member extending radially outward circumferentially spaced on a first end of the first coupler, and
   wherein the clamp has a first member on a first end, fingers extending inward and spaced circumferentially around the clamp on a second end, and an externally threaded surface, the fingers having an outside slanted surface, a first inside slanted surface, and a second inside slanted surface, and the second coupler having a cylindrical body defining a ring having a slanted surface having at least one member extending radially outward, and having a slanted surface at an end adjacent the ring, the collar having a cylindrical body with an axial bore defining an inwardly slanted surface on a first end and an internally threaded portion at a second end thereon configured for engaging the externally threaded surface of the clamp.

2. The robot arrangement as in claim 1, wherein the at least one robot component comprises one of a manipulator arm, a boom arm, a stick arm, a gripper, a gimble grip, a flexible joint, a tilt table, a dozer, a shovel, a plow, a pan tilt table, or a digger.

3. The robot arrangement as in claim 1, wherein the electrical connection comprises at least one of a universal serial bus, controller area network bus, UDP/IP, Ethernet, 802.11 b/g, Joint Tactical Radio System, and Joint Architecture for Unmanned Systems, or a combination therein.

* * * * *